United States Patent [19] [11] 3,975,031
Bennett [45] Aug. 17, 1976

[54] TOOL MOUNTING DEVICE

[75] Inventor: Gene Lee Bennett, North Madison, Ohio

[73] Assignee: Genio Tools, Inc., North Madison, Ohio

[22] Filed: Sept. 23, 1974

[21] Appl. No.: 508,210

Related U.S. Application Data

[63] Continuation-in-part of Ser. No. 351,163, April 16, 1973, Pat. No. 3,841,646, Continuation-in-part of Ser. No. 183,090, Sept. 23, 1971, Pat. No. 3,754,767.

[52] U.S. Cl. .................................. 279/14; 82/33 R; 279/76
[51] Int. Cl.² ........................................ B23B 31/04
[58] Field of Search ............... 279/14, 83, 1 A, 1 R, 279/76; 51/277; 82/33

[56] References Cited
UNITED STATES PATENTS

| 2,040,978 | 5/1936 | Cogsdill | 279/14 X |
| 2,606,034 | 8/1952 | Heldenbrand | 279/1 R X |
| 2,730,917 | 1/1956 | Obloy | 82/33 |
| 2,974,965 | 3/1961 | Welles, Jr. | 279/83 |

FOREIGN PATENTS OR APPLICATIONS

| 930,007 | 7/1955 | Germany | 82/33 |
| 192,591 | 12/1964 | U.S.S.R. | 82/33 |
| 123,775 | 1/1949 | Sweden | 82/33 |
| 425,706 | 3/1935 | United Kingdom | 279/76 |

Primary Examiner—Othell M. Simpson
Assistant Examiner—W. R. Briggs
Attorney, Agent, or Firm—Meyer, Tilberry & Body

[57] ABSTRACT

An interchangeable tool mounting device, which is particularly adapted for retaining turret lathe center drills in a desired position, includes an elongated body portion having at least one center drill receiving passage extending inwardly from at least one end thereof. The passage is adapted to receive a standard size center drill and includes a cylindrical portion and a tapered inner end portion of frusto-conical shape. Abutment surfaces or pins are provided in the tool receiving passage, and flutes formed on the center drill abut against the abutting surfaces or pins to position the center drill relative to the mounting device.

17 Claims, 16 Drawing Figures

TOOL MOUNTING DEVICE

This is a continuation-in-part of U.S. patent application Ser. No. 351,163 filed on Apr. 16, 1973 now U.S. Pat. No. 3,841,646 itself a continuation-in-part of U.S. patent application Ser. No. 183,090, filed Sept. 23, 1971, now U.S. Pat. No. 3,754,767.

This invention pertains to the art of material removal machines and more particularly to a tool positioning and mounting device for use in metal or other material removal machines.

The present invention is particularly applicable to use with turret lathes and the mounting of drills such as center drills therein, and will be described with particular reference thereto. However, it will be appreciated that the invention has broader applications and may be employed with other material removal machinery wherein a plurality of standard tool elements having various standard shank sizes are employed to perform specific material removal functions such as drilling, cutting, etc.

The aforementioned parent patent applications, the respective disclosures of which are incorporated herein by reference, disclose tool mounting devices which efficiently overcome problems associated with center drill location, storage and machine set-up, essentially by providing a single tool mounting device within which a plurality of center drills are mounted by means of tool holders, one center drill being mounted in an operating position and the others in a storage position. A plurality of different sized center drills are thus stored within the tool mounting device while the device is in use on a turret lathe or other machine. When a different size center drill is required, the tool holders can be relocated with the tool holder containing the appropriate size center drill placed in the operating position and the replaced holder returned to the storage position. Thereafter, the tool mounting device is suitably re-mounted on the turret lathe or other machine for operation. In this manner, valuable time lost making trips between the tool storage crib and the machine, the inconvenience of lost or misplaced center drills and other problems associated with prior art devices are overcome by the devices described in the aforementioned parent applications.

In the devices described in the aforementioned parent applications, each center drill element is aligned within its associated tool holder by the provision of a tapered section within the tool holder, which tapered section has an abutting shoulder or pin therein with which flutes formed on the tool elements engaged to retain the tool elements in alignment therein. The tapered section in the tool receiving passage advantageously provides a shoulder engaged by a tapered portion of a center drill to axially position the center drill relative to the passage. The abutment defined by the shoulder or pin is engaged by a center drill flute and thus stops rotation of the center drill relative to the passage. Therefore, the center drill is both axially and rotatively aligned relative to the tool receiving passage.

Heretofore in connection with prior art center drill holding devices, the points of the center drills bear against the bottom or end portion of a receiving passage to axially position the center drill within the tool holding device. After wear of the center drill point it becomes necessary to grind the point to sharpen it. Such grinding of course shortens the point and thereby shifts the position of the center drill axially relative to the tool receiving passage and thus the tool holder. Moreover, set screws alone are often used to hold the tool against rotation relative to the holder. Such arrangements are disadvantageous for many reasons including the inability to maintain a given axial positioning of the center drill relative to the holder and the fact that set screws do not provide a positive restraint against rotation.

The present invention provides a new and improved tool holder which overcomes the foregoing problems and others. More particularly, a center drill aligning and mounting tool holder is provided by which axial alignment and releaseable rotative engagement of a center drill and the tool holder is obtained and maintained.

In accordance with the present invention, there is provided an interchangeable tool mounting device for use in mounting one or more tool elements in a desired relationship to a machine. The tool holder includes a passage receiving the center drill. A portion of the passage engages an intermediate passage of the center drill between the extreme ends thereof to axially position the center drill independent of the ends and, therefore, independent of the precise end-to-end dimension thereof. An abutment is provided in the passage and is engaged by a flute of the center drill to prevent rotation of the center drill in the passage. In use, the center drill is introduced axially into the passage until engagement therewith provides the desired axial positioning, and the tool is then rotated until the flute engages the abutment. The center drill is thus axially and rotatively positioned relative to the holder. The holder is of course adapted to be mounted on a machine component such as the turret of a lathe.

Preferably, the tool holder passage includes a tapered section formed adjacent the axially inner end thereof for engagement with a tapered portion of the center drill to provide the desired axial alignment. The passage further includes a cylindrical axially outer end to receive the shank of the center drill, and a smaller diameter inner end to freely receive the tip end of the tool. As is well known, the flutes on center drills provide axially extending recesses along opposite sides of the drill from the tip end through the tapered portion and into the shank portion. These recesses also provide for the drill, in the flute area, to be narrower in cross section than the shank in the direction between the recesses. The abutment and center drill contour provide for the center drill to be axially positioned in the passage such that a flute of the drill circumferentially faces the abutment for engagement therewith upon rotation of the axially seated drill. Preferably, an abutment is provided for each of the center drill flutes.

In accordance with one embodiment, the abutment comprises a pair of abutment surfaces contiguous to the tool receiving passage and formed by generally diametrically opposed apertures extending through the tool holder and opening into the tool receiving passage. The apertures each extend transversely into the tool receiving passage and intersect a portion of both the tapered section and the cylindrical axially outer section thereof. The apertures, by intersecting the cylindrical and tapered portions of the passage at the line of juncture therebetween, enable axial positioning or seating of the center drill such that a portion of the flutes engages an inner surface portion of the apertures to prevent rotation of the seated drill.

In accordance with another embodiment, the abutment is a pin extending transversely into the tool receiving passage. Upon movement of the center drill axially into the passage the pin is received in a flute recess. Accordingly, when the drill is then pivoted about its axis, the flute engages the pin to prevent rotation.

In accordance with yet another embodiment, the passage in the tool holder, at the tapered portion thereof, is stepped radially inwardly with respect to the cylindrical portion receiving the shank and the inner end portion receiving the center drill tip end. Further, openings are provided in the holder body which open into the passageway axially across the stepped portion and on laterally opposite sides of the passage axis. Thus, a pair of generally diametrically opposed abutment surfaces are defined by the stepped portions intersected by the openings and which are engaged by the center drill flutes.

The principle object of the present invention is to provide an improved tool holder for center drills.

Another object of the invention is the provision of a tool holder of the foregoing character which provides for readily receiving a center drill and interengaging therewith to both axially and rotatively position the drill relative to the holder.

Another object of the invention is the provision of a center drill holder which provides for axially positioning a given drill relative thereto independent of the axial length of the drill between the tip ends thereof and independent of engagement of a tip end thereof with the holder.

Another object of the present invention is the provision of a center drill holder which interengages with a center drill to axially and rotatively position the drill in a manner which minimizes wear or damage to the drill tip and flutes by interengagement therebetween.

Yet another object of the present invention is the provision of a center drill holder which is simple and economical to manufacture, facilitates ready assembly and disassembly of a center drill therewith, and is efficient in operation.

The invention may take physical form in certain parts and arrangement of parts, preferred embodiments of which are described in detail in the specification and illustrated in the accompanying drawings which form a part hereof and wherein.

Figure 1:
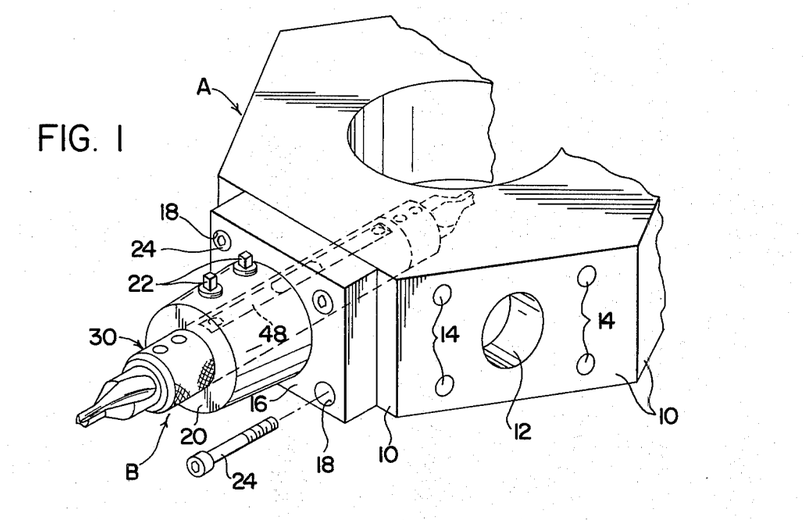
FIG. 1 is a perspective view showing the tool mounting device of the invention mounted in a turret lathe turret.

Referring now to the drawings wherein the showings are for the purpose of illustrating preferred embodiments of the invention and not for purposes of limiting the same, FIG. 1 shows a conventional turret portion A of a turret lathe having mounted thereon in operating position a tool mounting device B in accordance with the invention.

Turret A has six tool mounting faces 10 formed along the outer periphery thereof. Each face 10 has a tool receiving hole 12 formed therein. Disposed on each face 10 about tool receiving holes 12 are a plurality of face plate mounting holes 14. On one of the faces 10 a face plate 16, which has a plurality of mounting holes 18 formed therein to align with mounting holes 14, is affixed to turret A by fastening means comprising elongated bolts 24, one of which is shown withdrawn from its mounting holes 14, 18. Elongated bolts 24 pass through holes 18 and associated face plate mounting holes 14. Face plate 16 includes a mounting sleeve 20 which extends outwardly therefrom in alignment with the associated tool receiving hole 12. Mounting sleeve 20 also has holes formed therein and through which a pair of retaining bolts 22 extend to retain a tool mounting device B in desired operating position therein. This type of mounting arrangement is generally conventional within the art.

Figure 2:
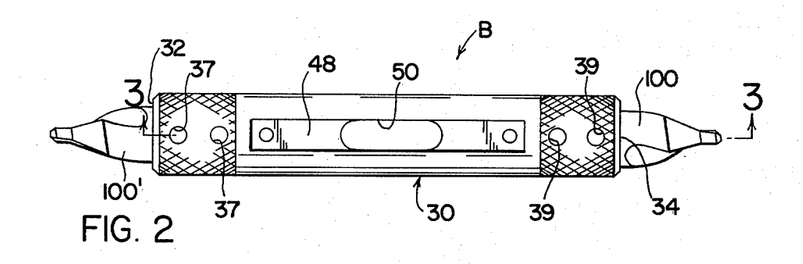
FIG. 2 is a plan view of a tool mounting device in accordance with the invention, with two center drills mounted therein.
Figure 3:
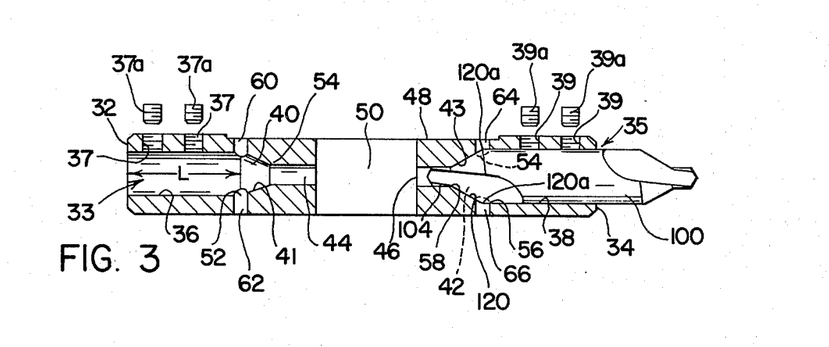
FIG. 3 is a cross-sectional view taken along line 3—3 of FIG. 2, with one of the center drills removed.

Referring particularly to FIGS. 2 and 3, tool mounting device B includes a generally cylindrical body portion 30 which, in the preferred embodiment, is made from hot rolled steel although it will be appreciated that it can be constructed from any suitable material.

An elongated land area 48 is disposed along the outside of the body portion 30 to provide means for retaining tool mounting device B in position within tool receiving hole 12 of turret A by means of retaining bolts 22 bearing against land 48, as is conventional. Body portion 30 has end faces 32 and 34, and tool receiving passages 33 and 35 extend axially inwardly therefrom. Passages 33 and 35 include corresponding cylindrical portions 36 and 38 and corresponding frusto-conical tapered portions 40 and 42 at the inner ends of the cylindrical portions. Cylindrical portions 36 and 38 are coaxially aligned with the longitudinal axis of body portion 30 and the longitudinal lengths thereof are shown in FIG. 3 with respect to passage 36 by the dimension L. Tool receiving passages 33 and 35 are of different size from each other in order to accommodate, respectively, two different size standard center drills. Tapered sections 40 and 42 communicate through extension passages 44 and 46 with a clearance passage 50 which extends through body 30 generally centrally thereof.

Threaded fastener receiving holes 37 pass through body portion 30 and communicate with cylindrical passage portion and threaded fastener receiving holes 39 similarly communicate with cylindrical passage portion 38. Threaded fasteners 37a and 39a are used to secure tool elements in place within tool passages 33 and 35.

Tapered section 40 is defined by sloping walls 41 and tapered section 42 is similarly defined by sloping walls 43. Holes 60 and 62 penetrate the body portion 30 radially from the outer surface thereof, and are positioned diagonally opposite and substantially coaxially to each other. Holes 60 and 62 intersect tool receiving passage 33 at the intersection of the cylindrical portion 36 thereof with the tapered section 40. The intersecting holes define abutment surfaces 52 contiguous to the tool receiving passage and extending therein. Abutment surfaces 52 are engageable by the flutes of the center drill, as more fully described hereinbelow. Similarly, holes 64 and 66 form abutment surfaces 54 contiguous to and disposed within tool receiving passage 35. In general, the positioning of the tools is provided by the combination of tapered sections 40 and 42 and the associated abutment surfaces 52 and 54.

Figure 4:
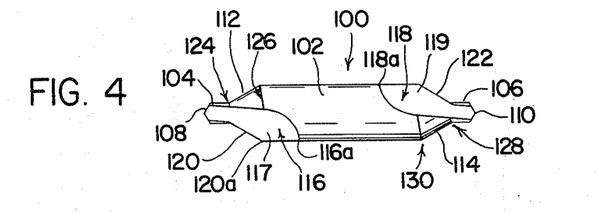
FIG. 4 is a side view of a typical center drill used in conjunction with the tool mounting device of the invention.

As seen in FIG. 2, two standard center drills 100 and 100' are retained within tool mounting device B. Although each center drill is of a different size, the center drills are substantially identical in construction. Accordingly, only center drill 100, shown in FIG. 4, is described in detail. Referring to FIG. 4, center drill 100 has a substantially cylindrical central shank portion 102. At the opposite ends of drill 100 are small diameter, substantially cylindrical ends 104 and 106 which are tapered to points 108 and 110. Ends 104 and 106 each respectively merge into shank portion 102 along tapered, quasi-conical portions 112 and 114. Ends 104, 106 and their associated points 108, 110 comprise respective ends of center drill 100. The remainder of center drill 100 may be considered the intermediate portion thereof. Center drill 100 has recesses 116 and 118 at its respective opposite ends to provide flutes including cutting edges 120 and 122. Walls 117 and 119 of recesses 116 and 118 intersect tapered portions 112 and 114 to define the flutes or cutting edges 120 and 122, respectively. While only one flute and cutting edge is shown at each end of the tool, it will be appreciated that each end includes a second recess opposite the corresponding one of recesses 116 and 118. Accordingly, each end of the tool includes two flutes and cutting edges 120 and 122. Moreover, it will be appreciated that recesses 116 and 118 have terminal ends 116a and 118a, respectively, which merge and intersect with the outer surface of shank portion 102.

Tapered portions 112 and 114 are not true conical shapes but are actually ground to be somewhat helically conical so as to provide a rake angle for cutting into material, as is well known in the art. Moreover, as is inherent with such center drills, the opposed recesses at each end provide for the drill to have a width in the direction between the recesses and in the axial area of the flutes which is less than the diameter of shank 102. Further, the sloping surfaces of tapered portions 112 and 114 of center drill 100 slope at a lesser angle than the walls 41 and 43 of the associated tapered sections 40 and 42 of tool receiving passages 33 and 35. Still further, the length of tapered portion 112 between points 124 and 126 and the length of tapered portion 114 between points 128 and 130 is less than, respectively, the length along the sloping wall 41 of tapered section 40, and the length along the sloping wall 43 of tapered section 42. Therefore, for example, when the end of center drill 100 to the left in FIG. 4 is introduced into tool receiving passage 35, as shown in FIG. 3, tapered portion 112 of the drill fits into tapered section 42 deeply enough axially to permit the outer end 120a of each of the cutting edges 120 to axially overlie and abut against a corresponding one of the abutment surfaces 54. This abutting action occurs, of course, only in one rotational direction of center drill 100 relative to tool receiving passage 35. End 104 of drill 100 fits into extension passage 46 and the latter extension passage and clearance passage 50 provide for accommodating any reasonable length of end 104 without an obstruction abutting against point 108 thereof. While two axially aligned and diametrically opposed holes are performed so as to provide abutment surfaces for each flute at the corresponding end of the drill, it will be appreciated that only one such hole is necessary. In this respect, the portion of the passage opposite the end of such holes can be axially and radially outwardly enlarged such as by grinding so as to provide clearance for axially seating the drill and positioning a flute edge in overlying relationship with respect to the abutment surface provided by the one hole.

As hereinabove stated, body portion 30 is preferably made so as to accommodate two different sized center drills within, respectively, tool receiving passages 33 and 35. As is well known, the shank or central mounting portion 102 of a center drill increases in diameter as the center drill size increases. Various standard center drill sizes have been established by the American National Standard Institute for combined drills and countersinks, which sizes are given numerical designations with the smaller center drills having the lower designations and the larger center drills having the higher number designations. Specifically, in a preferred embodiment, tool receiving passages 33 and 35 in tool mounting device B would be dimensioned to receive, respectively, a number 5 and number 2 centering drill. A set of tool mounting devices in accordance with the invention would preferably include a second embodiment of tool mounting device B similar to that illustrated in FIGS. 2 and 3 but having two tool receiving passages sized to receive respectively, a No. 4 and a No. 3 centering drill. A third tool mounting device of the set would be a similar tool mounting device to that shown in FIGS. 2 and 3 but adapted to receive, respectively, a No. 6 and a No. 7 centering drill.

In each case, the longitudinal length L of cylindrical portions 36 and 38 of the tool receiving passages must be long enough to permit one end of its associated center drill to fit within tapered sections 40 and 42 so that the center drill flutes engage the abutment surfaces 52 and 54. Additionally, length L must provide for the opposite tapered end to extend from main body portion 30, a distance sufficient to engage a workpiece when body portion 30 is mounted on turret A, as illustrated in FIG. 1.

A significant advantage of the arrangement shown in FIGS. 2 and 3 is that when it becomes necessary to grind points 108 and 110 of the center drill after they have become dulled with use, the consequent shortening of the points does not affect the retention of the center drill within its associated tool receiving passage. This is so because it is the engagement of flutes 120 or 122 with the abutment means and engagement of tapered portions 112 or 114 within the tapered sections 40 and 42 that maintains the center drill in place. Accordingly, shortening of the points by grinding does not affect the ability of the center drill to be maintained within body portion 30 and to project a sufficient distance therefrom to suitably engage the workpiece.

Figure 5:
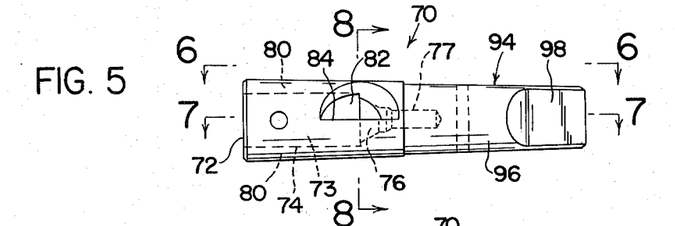
FIG. 5 is a plan view of a second tool mounting device in accordance with the invention.
Figure 6:
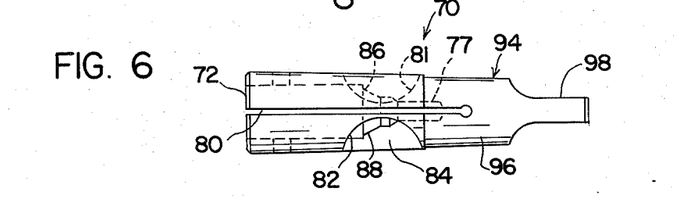
FIG. 6 is a side view of the device shown in FIG. 5.
Figure 7:
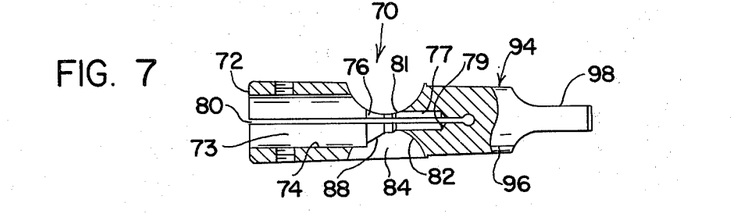
FIG. 7 is a section taken along line 7—7 of FIG. 5.

Referring now to FIGS. 5–9, there is shown another embodiment of a tool holder constructed in accordance with the present invention. Tool holder 70 as best seen in FIGS. 5–7, includes a body portion having an end face 72 through which opens a tool receiving passage 73. Passage 73 includes a cylindrical outer portion 74 which extends longitudinally of tool holder 70, a radially inwardly stepped frusto-conical tapered section 76, and a cylindrical inner end portion 77. Passage 73 can, for example, be provided by boring the tool holder using a boring tool designed to provide the desired contour. The stepped conical portion serves the purpose set forth hereinafter.

Figure 8:
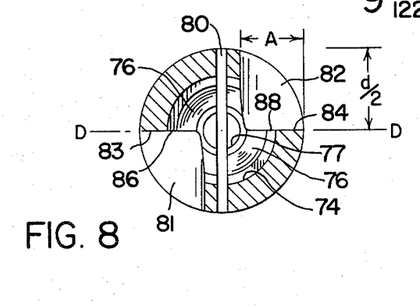
FIG. 8 is a section view taken along line 8—8 of FIG. 5.

As best seen in FIGS. 6 and 8, an elongated flex slot 80 is cut through tool holder 70, the plane of which slot passes through the longitudinal axis of the tool holder. Slot 80 extends longitudinally along tool holder 70 and intersects tool receiving passage 73 on diametrically opposed sides thereof. In the embodiment shown, slot 80 extends longitudinally through the tool receiving passage and terminates beyond bottom 79 of the extension passage.

A portion of the material of tool holder 70 is removed such as by milling to provide openings 81 and 82 on opposite sides of the plane of slot 80. Each opening intersects the tool receiving passage on longitudinally opposite sides of radially stepped section 76 and thus axially bridges the stepped section. The openings may, for example, be milled out with a circular cutting wheel so as to be of the arcuate configuration shown. As best seen in FIG. 8, the width of the milled-out portion parallel to the plane of slot is preferably one-half the diameter of the body portion of the tool holder, as indicated by the dimension d/2 in FIG. 8. The depth of the milled-out portion perpendicular to the plane of slot 80 is preferably somewhat less than one-half the diameter, as indicated by the dimension A in FIG. 8. Such milling provides for openings 81 and 82 to have generally flat surfaces 83 and 84 respectively, and which surfaces are coincident with a plane D—D perpendicular to the plane of slot 80 and extending through longitudinal center axis of tool holder 70. A portion of each surface 83 and 84 intersects radially stepped portion 76 of the passage to define abutment surfaces 86 and 88, respectively, against which the flutes of a center drill abut as set forth hereinafter.

Figure 7A:
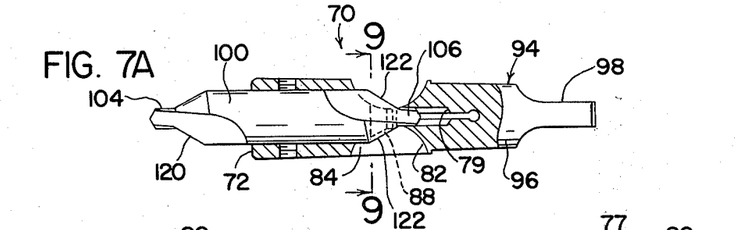
FIG. 7A is a view identical to FIG. 7 except that a center drill is shown mounted in the device.
Figure 9:
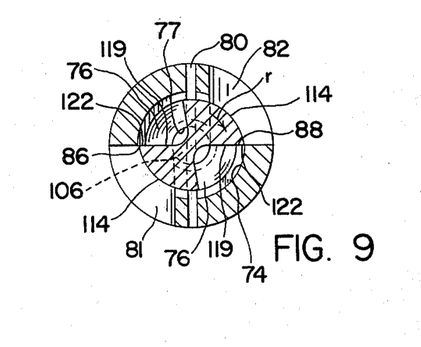
FIG. 9 is a section view taken along 9—9 of FIG. 7A.

As shown in FIG. 7A, a standard center drill 100 of the structure described hereinabove and of suitable size is introduced into the tool receiving passage 73 until the tapered portion of the drill engages the tapered portion of the passage. Openings 81 and 82 together with the opposed tool recesses and the inherent narrower dimension in the direction between the recesses provide for such insertion to position the flutes such that edge portions of the flutes parallel to each of the cutting edges 122 overlie and abut against a corresponding one of the abutment surfaces 86 and 88 upon twisting of the axially seated center drill. As shown in FIG. 9, edges 122 engage abutment surfaces 86 and 88 in the direction of arrow r. As further shown in FIG. 7A, the length of extension passage 77 is greater than the length of end 106 of center drill 100. Accordingly, the extent of penetration of center drill 100 within tool holder 70 is not limited by the bottom end 79 of passage 77, but by the engagement of tapered portion 114 with tapered section 76 of passage 73. In this manner, as with the embodiment of the FIGS. 2 and 3, center drill 100 is positionally maintained within tool holder 70 independent of end 106, and such positioning is not affected by the machining or grinding of point 110 and the consequent shortening of end 106 when such repointing of the center drill is required. In use, tool holder 70 rotates in the direction opposite arrow r in FIG. 9 and center drill 100 is held against rotation relative to the tool holder by cooperation between the flutes and abutment surfaces 86 and 88.

Openings 81 and 82 also provide access to the interior of the tool receiving passage for insertion of a drift pin or other suitable tool to help in dislodging a center drill from the tool holder 70 when it is desired to dismantle the same. It will be appreciated that the stresses of working tend to jam the center drill tightly within holder 70 and removal of the center drill is facilitated by the access provided for by openings 81 and 82. Most preferably, two semi-circular openings are provided in opposite quadrants of the cross-sectional configuration of the tool holder in the manner exemplified in FIGS. 8 and 9 of the drawings. It will be appreciated, however, that a side portion of the tool receiving passage opposite one of the abutment surfaces thus defined could be ground away to provide the necessary clearance for axial seating of the drill in the passage, whereby the one remaining abutment surface would provide the desired restraint against drill rotation.

The end of holder 70 opposite from end face 72 includes an integral mounting shank 94 having a generally conical portion 96 and a standard Morse Taper. The mounting shank further includes a flattened portion 98. Flattened end portion 98 is utilized for releasably securing tool holder 70 within a turret lathe chuck or the like as is well known and conventional in the art. The outer configuration of tool holder 70 makes it possible to easily secure it within a chuck or the like which is adapted to receive a mounting shank having a standard Morse Taper.

Figure 10:
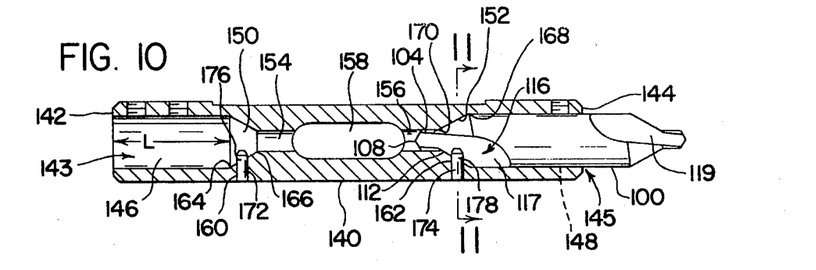
FIG. 10 is a view generally corresponding to that of FIG. 3 showing another embodiment of a tool mounting device in accordance with the invention.
Figure 11:
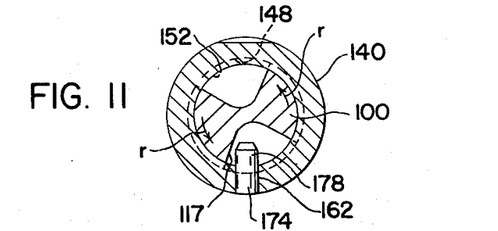
FIG. 11 is a section view taken along line 11—11 of FIG. 10.

Referring now to FIGS. 10 and 11, there is shown yet another embodiment of a tool holder device in accordance with the invention and adapted to hold two different sized center drills. The tool holder comprises a cylindrical body portion 140 having opposite end faces 142 and 144. A first tool receiving passage 143 extends into body 140 from end face 142 and a second tool receiving passage 145 extends into the body from end 144. Passages 143 and 145 are coaxial with the longitudinal axis of body portion 140 and include, respectively, cylindrical outer portions 146 and 148, frusto-conical tapered portions 150 and 152, and cylindrical inner end portions 154 and 156. Portions 154 and 156 each open into a clearance passage 158, extending diametrically through body portion 140.

The construction of cylindrical passage portions 146 and 148 and their associated tapered sections 150 and 152 are similar to that shown in the embodiments of FIGS. 2 and 3 with respect to tool receiving passages 33 and 35. Holes 160 and 162 extend radially into body portion 140 and intersect tapered sections 150 and 152 of the tool receiving passages respectively. As in the embodiment of FIGS. 2 and 3, the length along the sloped wall of tapered section 150 is measured between points 164 and 166, and the length along the sloped wall of tapered section 152 is measured between points 168 and 170. Pins 172 and 174 are retained by a press fit in holes 160 and 162 and have tapered inner end portions 176 and 178 which project into tapered sections 150 and 152, respectively.

The tool receiving passages are adapted to receive an appropriate size center drill 100 of the structure shown in FIG. 4 and described herein in connection with the latter Figure. In FIGS. 10 and 11 such a tool is shown in association with the tool receiving passage 143. As will be seen from these Figures, center drill 100 is inserted in the passage until tapered portion 112 thereof engages the tapered passage portion 152 and cylindrical end 104 of the drill enters extension passage 156. During such movement, pin 174 enters drill recess 116. Center drill 100 is then rotated in the direction of arrow r in FIG. 11 and such rotation moves wall 117 of recess 116 of the drill into engagement with inner end 178 of pin 174. Center drill 100 is thus firmly received within the tool receiving passage and is properly aligned and axially positioned with respect thereto. As with the previous embodiments described, any necessary grinding of end point 108 to re-sharpen or re-point the same, will not affect the proper alignment or axial positioning of center drill 100 within the tool receiving passage, regardless of the degree of shortening of cylindrical end 108.

The concepts of the present invention, while having among their advantages the utilization of generally smaller tool holding devices to retain standard center drills therein without the need of auxillary holders, are equally applicable to the concept disclosed in the parent patent applications referred to above. For example, tool holders may be provided with center drill receiving passages having tapered sections and abutment arrangements such as those described herein in order to automatically align and retain center drills within the tool holders. The tool holders themselves may then be placed in tool holder receiving bores provided in holder bodies mountable on a turret lathe or other metal working machine. Such a tool holder and holder body combination is illustrated in FIGS. 12 and 13 of the drawing.

Figure 12:
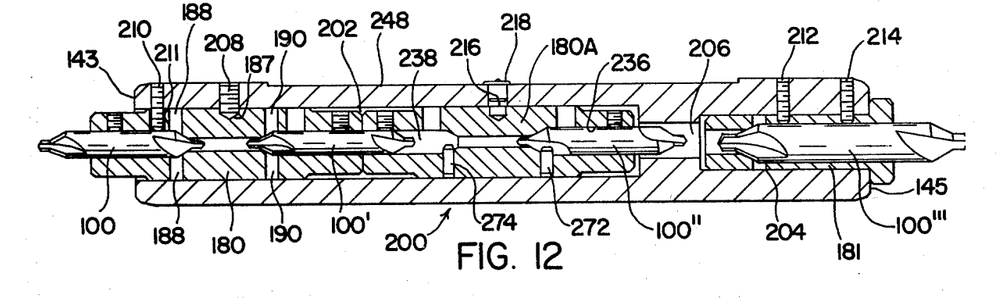
FIG. 12 is a view in elevation of another embodiment of the invention which employs tool holders.
Figure 13:
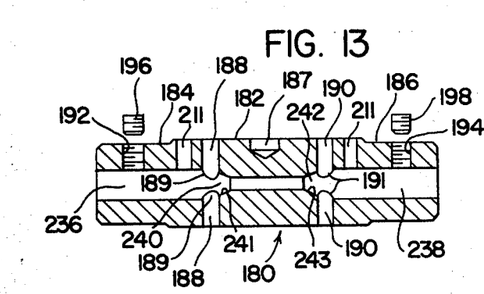
FIG. 13 is a view in elevation cross section of a tool holder of the FIG. 12 embodiment.

FIG. 13 shows a tool holder 180 which is provided with a pair of center drill receiving passages including cylindrical portions 236 and 238 and corresponding frusto-conical tapered portions 240 and 242. Tapered sections 240 and 242 have, respectively, sloped walls 241 and 243. As shown in FIG. 12, the tool receiving passages receive different size center drill of the structure herein described and which are designated by numerals 100 and 100', respectively. Tool holder 180 is substantially cylindrical in cross section and includes an intermediate portion 182 which is slightly larger in diameter than end portions 184 and 186. The exterior of tool holder 180 has a locating detent 187 provided in intermediate portion 182 thereof, and further has diametrically opposed pairs of holes 188 and 190 drilled through the exterior wall of tool holder 180. Holes 188 and 190 intersect the corresponding tool receiving passages to define abutment surfaces 189 and 191 corresponding to surfaces 52 and 54 described herein in connection with the embodiment of FIGS. 2 and 3. Threaded fastener receiving holes 192 and 194 are also drilled through the exterior wall of tool holder 180 and communicate with the cylindrical passages portions 236 and 238 respectively. Threaded fasteners 196 and 198, may be threadedly engaged with holes 192 and 194 to assist in holding and retaining the center drills within the corresponding tool receiving passage.

FIG. 12 shows a tool holder receiving body 200 having a first longitudinal bore 202 and a second longitudinal bore 204. Bores 202 and 204 are coaxial and are interconnected by a connecting passageway 206. Tool holder 180 is received within bore 202 and is positioned at the outer end thereof by a threaded fastener 208 extending through body 200 and having a tapered end which engages locating detent 187. Threaded fastener 210 passes through a threaded fastener receiving hole in body 200 and an untreaded bore 211 in the tool holder. Fastener 210 assists in retaining tool holder 180 in its proper location within tool holder body 200, and further assists in retaining center drill 100 in place.

Figure 14:
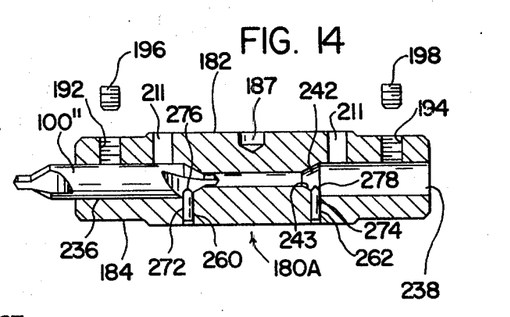
FIG. 14 is a view in elevation cross section of an alternate form of tool holder usable in the FIG. 12 embodiment.

A second tool holder 180A adapted to hold a different size center drill designated 100'', is also disposed within bore 202 of tool holder receiving body 200, as is a single center drill tool holder 181 which is received in bore 204 and carries a center drill 100'''. Tool holder 180A shown in detail in FIG. 14 is similar in structure to that of tool holder 180 shown in FIG. 13, and identical parts are identically numbered. Center drill 100'' is illustrated as received within the tool receiving passage defined by cylindrical portion 236 and tapered portion 240. Tool holder 180A is different from holder 180 in that abutment defining holes 188 and 190 are replaced by holes 260 and 262 receiving abutment pins 272 and 274, respectively. Pins 272 and 274 are retained in holes 260 and 262 by a press fit and have inner ends 276 and 278, respectively, projecting into the corresponding tool receiving passage. Pin ends 276 and 278 define abutments for tools in the corresponding passages as described herein with regard to the tool holder shown in FIGS. 10 and 11.

The outer surface of tool holder 180A is sized so as to be snugly but slidably received within bore 202 and the tool holder is retained in the bore by and between tool holder 180 and the inner end of the bore. It will be noted that tool holder 180A shown in FIG. 12 is reversed in orientation with respect to FIG. 14. Accordingly, center drill 100'' has its outer end in connecting passage 206, and tool receiving passage portion 238 is empty and receives the outer end of center drill 100'. Tool holder 181, mentioned hereinabove, has a tool receiving passage including a cylindrical portion and a frusto-conical tapered portion, and is provided with diametrically opposed holes at the juncture between the latter portions. Thus, as described herein in connection with tool holder 180, for example, the opposed holes intersect the tapered portions to define abutment surfaces for the flutes of tool 100'''. Threaded fasteners 212 and 214 extend through threaded openings in body 200 and through corresponding openings in the body of tool holder 181, thus to retain the tool holder in body 200 and tool 100''' in the tool holder.

Tool holder body 200 is provided with a longitudinal flat land portion 248 to facilitate the mounting thereof during use. An oil cup opening 216 opens into bore 202 from flat 248 and contains an oil cup 218 which provides an oil reservoir. The reservoir provides for oil flow to bore 202 so that the tool holders therein are coated to help prevent rusting thereof.

Figure 15:
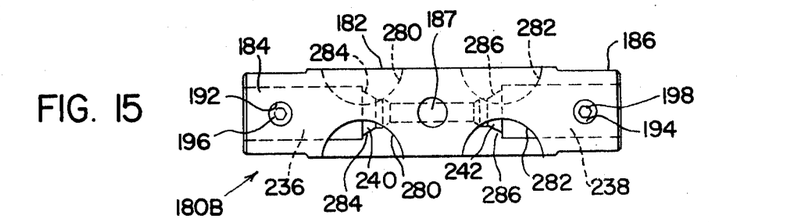
FIG. 15 is a plan view of another alternate form of tool holder usable in the FIG. 12 embodiment.

Referring now to FIG. 15, another tool holder 180B usable in tool holder receiving body 200 of FIG. 12 is shown. Tool holder 180B is generally similar to tool holder 180 shown in FIG. 13 and parts thereof identical to the tool holder 180 are identically numbered. Tool holder 180B differs from tool holder 180 in that abutment defining holes 188 and 190 are replaced by arcuate openings or passages 280 and 282. In the manner described herein in connection with the embodiment of FIGS. 5–9, passages 280 and 282 intersect the corresponding center drill receiving passages to define abutment surfaces 284 and 286, respectively. The tool receiving passages may be, and preferably are, of different size to receive therein different standard size center drills.

While considerable emphasis has been placed herein on the specific structures of the preferred embodiments illustrated and described, it will be appreciated that many modifications of the disclosed structures can be made without departing from the principles of the present invention. In this respect, the shoulders against which the tapered portions of the center tools abut to axially position the drill in the tool receiving passageway can be defined by a structure other than tapered portions of the tool receiving passageways. For example, the portion of the passageway receiving the drill shank and the portion receiving the drill tip could be interconnected by a radial wall transverse to the passageway axis. The intersection between such a wall and the portion of the passageway receiving the drill tip would then define a shoulder for engagement by the tapered portion of the drill to axially position the drill. Further, it will be appreciated that the several embodiments of structures defining abutment surfaces for the flute of the center drill can be selectively employed with the several different tool holder body constructions shown herein or with other tool holder structures. Still further, the pins employed to provide abutment surfaces for the flutes could be defined by removable elements such as set screws as opposed to the press fitted pins herein described. Many embodiments of the present invention can be made, and many changes including those pointed out hereinabove can be made in the embodiments herein illustrated and described without departing from the principles of the present invention. Accordingly, the foregoing descriptive matter is to be interpreted merely as illustrative of the present invention and not as a limitation.

What is claimed is:

1. In a tool holder for a center drill having a circular shank portion of a given diameter, a smaller diameter tip portion coaxial with said shank portion, a tapered portion between said shank and tip portions, and flute means extending from said tip portion through said tapered portion and into said shank portion, said flute means including recess means having terminal end means interconnecting the circular outer surface of said shank portion, and said tool holder comprising a body member having an end and a tool receiving passage extending thereinto from said end, the improvement comprising: said passage having an axially outer cylindrical portion of a diameter to receive said shank portion and an axially inner portion to receive said tip portion, said inner portion of said passage having a transverse dimension smaller than said given diameter of said shank portion of said center drill, said passage including a tapered section between said outer and inner portion of said passage, said tapered section being engaged by said tapered portion of said center drill to axially position said center drill in said passage, and abutment means in said passage to engage said flute means against rotation of said center drill in said passage, said abutment means including surface means located radially inwardly with respect to the surface of said axially outer cylindrical portion of said passage, and said abutment means being axially located in said passage to intersect both said outer cylindrical portion and said tapered section of said passage.

2. The improvement according to claim 1, wherein said abutment means includes pin means mounted on said body member and projecting inwardly of said tool receiving passage.

3. The improvement according to claim 2, wherein said pin means includes at least one pin element extending radially of said passage.

4. The improvement according to claim 3, wherein two such pin elements are provided in axially aligned diametrically opposed relationship with respect to said passage.

5. In a tool holder for a center drill having a circular shank portion of a given diameter, a smaller diameter tip portion coaxial with said shank portion, a tapered portion between said shank and tip portions, and flute means extending from said tip portion through said tapered portion and into said shank portion, said flute means including recess means having terminal end means intersecting the circular outer surface of said shank portion, and said tool holder comprising a body member having an end and a tool receiving passage extending thereinto from said end, the improvement comprising: said passage having an axially outer cylindrical portion of a diameter to receive said shank portion and an axially inner portion to receive said tip portion, said inner portion of said passage having a transverse dimension smaller than said given diameter of said shank portion of said center drill, said passage including shoulder means engaged by said tapered portion of said center drill to axially position said center drill in said passage, and abutment means in said passage to engage said flute means against rotation of said center drill in said passage, said abutment means including surface means located radially inwardly with respect to the surface of said axially outer cylindrical portion of said passage, said abutment means being axially located in said passage forwardly of said terminal end means of said recess means when said shoulder means is engaged by said tapered portion, said shoulder means being a tapered section of said tool receiving passage between said outer and inner passage portions, and said abutment means comprising means defining opening means extending through said body member into said passage and intersecting both said outer cylindrical portion and said tapered section of said passage to define said surface means of said abutment means.

6. The improvement according to claim 5, wherein said opening means includes at least one circular hole radially intersecting said outer cylindrical portion and said tapered section of said passage.

7. The improvement according to claim 6, wherein two such circular holes extend through said body member in diametrically opposed and axially aligned relationship.

8. The improvement according to claim 5, wherein said opening means includes at least one opening extending partially through said body member in laterally offset relationship with respect to a longitudinal plane through the axis of said tool receiving passage.

9. The improvement according to claim 8, wherein two such openings are provided in generally diametrically opposed locations with respect to said body member and on opposite sides of said plane.

10. The improvement according to claim 9, wherein said tapered section of said tool receiving passage includes a wall portion radially offset inwardly of said passage at the axially inner end of said outer portion of said passage, said two such openings each including a radial surface through said offset portion, said radial surfaces defining said surface means of said abutment means.

11. In a tool holder for a center drill having a circular shank portion of a given diameter, a smaller diameter tip portion coaxial with said shank portion, a tapered portion between said shank and tip portion, and flute means extending from said tip portion through said tapered portion and into said shank portion, said flute means including recess means having terminal end means intersecting the circular outer surface of said shank portion, and said tool holder comprising a body member having an end and a tool receiving passage extending thereinto from said end, the improvement comprising: said passage having an axially outer cylindrical portion of a diameter to receive said shank portion and an axially inner cylindrical portion to receive said tip portion, said inner portion being of a diameter smaller than said given diameter of said shank portion of said center drill, said passage further including a tapered section between said outer and inner portions of said passage, said tapered section being engaged by said tapered portion of said center drill to axially position said center drill in said passage, means defining an opening extending into said body member in a direction transverse to the axis of said passage, said opening having an inner end intersecting both said outer portion and said tapered section of said passage to provide an abutment surface in said passage to engage said flute means against rotation of said center drill in said passage when said tapered section of said passage is engaged by said tapered portion of said center drill.

12. The improvement according to claim 11, wherein said opening is a circular aperture extending radially of the axis of said passageway.

13. The improvement according to claim 12, and a second opening defined by a second circular aperture, said apertures being axially aligned and diametrically opposed with respect to one another.

14. The improvement according to claim 11, wherein said opening is laterally offset with respect to a longitudinal plane through the axis of said passage and intersects said passage to provide a radial surface generally perpendicular to said plane, a radially inward portion of said radial surface defining said abutment surface.

15. The improvement according to claim 14, and a second opening in said body member in a location generally diametrically opposed with respect to the first said opening, said first and second openings being on laterally opposite sides of said plane.

16. The improvement according to claim 15, wherein the radial surface of each said first and second openings are coplanar and lie in a longitudianl plane through the axis of said passage and perpendicular to the first named plane.

17. The improvement according to claim 16, wherein said tapered section of said passage is radially offset inwardly of the passage relative to said cylindrical outer portion and said cylinder inner portion.

* * * * *